W. A. Alexander,
Saw-Set,
N° 61,377. Patented Jan. 22, 1867.
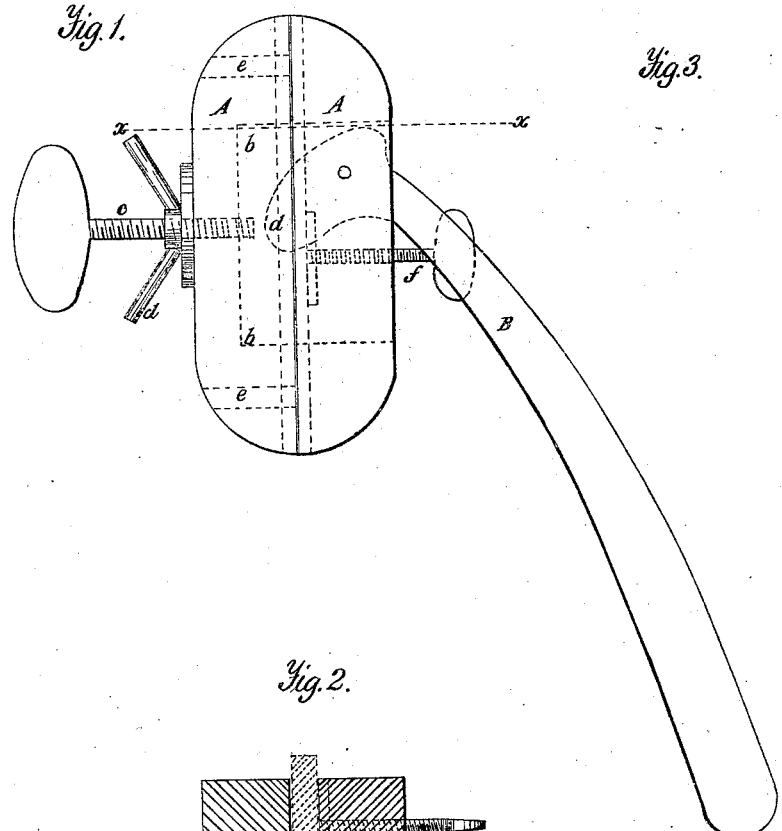
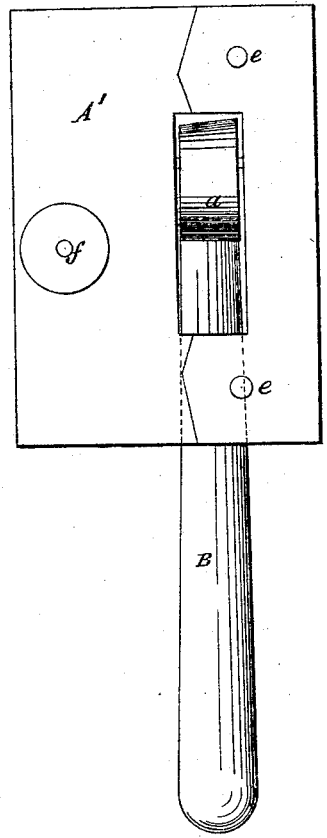
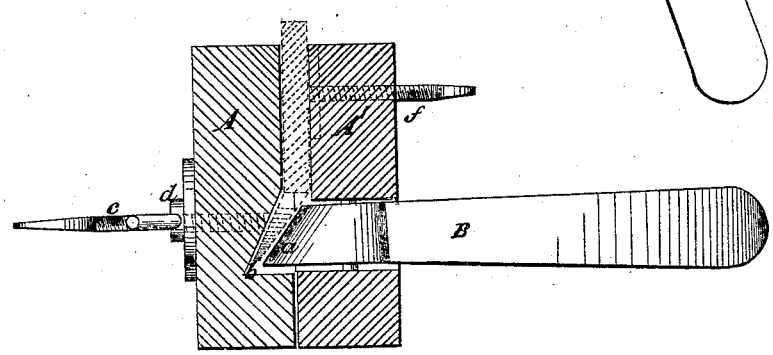
Witnesses.
Theo Tusch
J. A. Service
Inventor:
W. A. Alexander
Per Munn & Co.
Attorneys.

United States Patent Office.

W. A. ALEXANDER, OF MOBILE, ALABAMA.

Letters Patent No. 61,377, dated January 22, 1867.

IMPROVEMENT IN SAW-SETS.

*The Schedule referred to in these Letters Patent and making part of the same.*

TO ALL WHOM IT MAY CONCERN:

Be it known that I, W. A. ALEXANDER, of Mobile, in the county of Mobile, and State of Alabama, have invented a new and improved Saw-Set; and I do hereby declare that the following is a full, clear, and exact description thereof, which will enable others skilled in the art to make and use the same, reference being had to the accompanying drawings, forming a part of this specification, in which—

Figure 1 is a side view of the saw-set of my invention.

Figure 2 is an inside view of one part detached.

Figure 3 is a cross-section, taken in the plane of the line $x\,x$, fig. 1.

Similar letters of reference indicate like parts.

This invention relates to an improved device for setting saw teeth, and consists of a clamp formed in two parts, one of which parts contains a recess for receiving the saw tooth, when it is bent as desired by means of a lever in the other part, the extent of the deflection of the tooth being regulated by a set-screw in the recess, which limits it as desired. By this device the teeth of circular or straight saws can be set with the most perfect evenness and accuracy, to any degree of deflection required, with great ease and dispatch. The instrument is made of iron, of various sizes, to suit the saws.

A A represent two thick rectangular blocks, in one of which, A′, is pivoted a hand-lever, B, which has for its short arm a curved elbow, $a$, which works in a rectangular cavity in the block, so that when the lever is raised the elbow $a$ rises in the cavity, and the heel of the lever is then flush, or nearly so, with the inside face of the block; and when the lever is depressed, for setting a saw tooth, the curved elbow shall project beyond the plane of the face of the block, as shown in figs. 1 and 2. The face of the block A has a recess, $b$, in it, of suitable size for receiving a saw tooth, having an inclined-plane bottom at any or the greatest required angle for the deflection of the tooth when set, as shown at fig. 2. A set-screw, $c$, passes through the block A, the point of which enters the recess $b$, and may be adjusted so that the point shall regulate the depth of the bend made in the saw tooth when set, or the degree of deflection given to it; and on the outside of the block A is a jam-nut, $d$, on the set-screw which holds it in place when adjusted for setting the saw teeth. The blocks A A′ are fastened together by screws, $e\,e$, or in any suitable way, and a set-screw, $f$, may be put in the block A′, for clamping on the saw blade, if desired, as shown in fig. 2.

The saw blade and tooth are placed between the blocks A A′, for which purpose a proper space is made between them on one side, and the tooth is properly adjusted in the recess $b$, when the lever B is raised and the heel is out of the way; then, by depressing the lever, the elbow $a$ will bear upon the saw tooth and give it the desired deflection, or set it by bending at any required angle, so that all the teeth on a saw may be successively set exactly at the same degree of deflection.

Having thus described my invention and its operation, what I claim as new, and desire to secure by Letters Patent, is—

The combination of the lever B, pivoted in the block A′, with the recess $b$ and the set-screw $c$ in the block A, forming an adjustable saw-set, constructed and operating substantially as herein described.

W. A. ALEXANDER.

Witnesses:
 WILLIAM SPENCE,
 HENRY C. CHRISTOPHER.